July 28, 1953 — P. J. SELGIN — 2,646,717
DEVICE FOR THE IDENTIFICATION OF DOCUMENTS OR PRINTED MATTER
Filed Sept. 20, 1950

INVENTOR.
Paul J. Selgin

Patented July 28, 1953

2,646,717

UNITED STATES PATENT OFFICE 2,646,717

DEVICE FOR THE IDENTIFICATION OF DOCUMENTS OR PRINTED MATTER

Paul J. Selgin, Washington, D. C.

Application September 20, 1950, Serial No. 185,804

5 Claims. (Cl. 88—14)

This invention relates to an improved apparatus for comparing a document, a sheet of printed matter, or the like, with an authentic copy of the same document or a reproduction thereof, in order to establish the identity of said document with said authentic copy or reproduction.

Several methods for achieving this purpose are known, but these depend on the accurate positioning of the document with respect to the comparison standard for reliable operation. The present method is held to constitute an improvement in that it does not require such accurate positioning and lends itself therefore to automatic operation. A further advantage of the method herein described is its relative simplicity.

Figure 1:
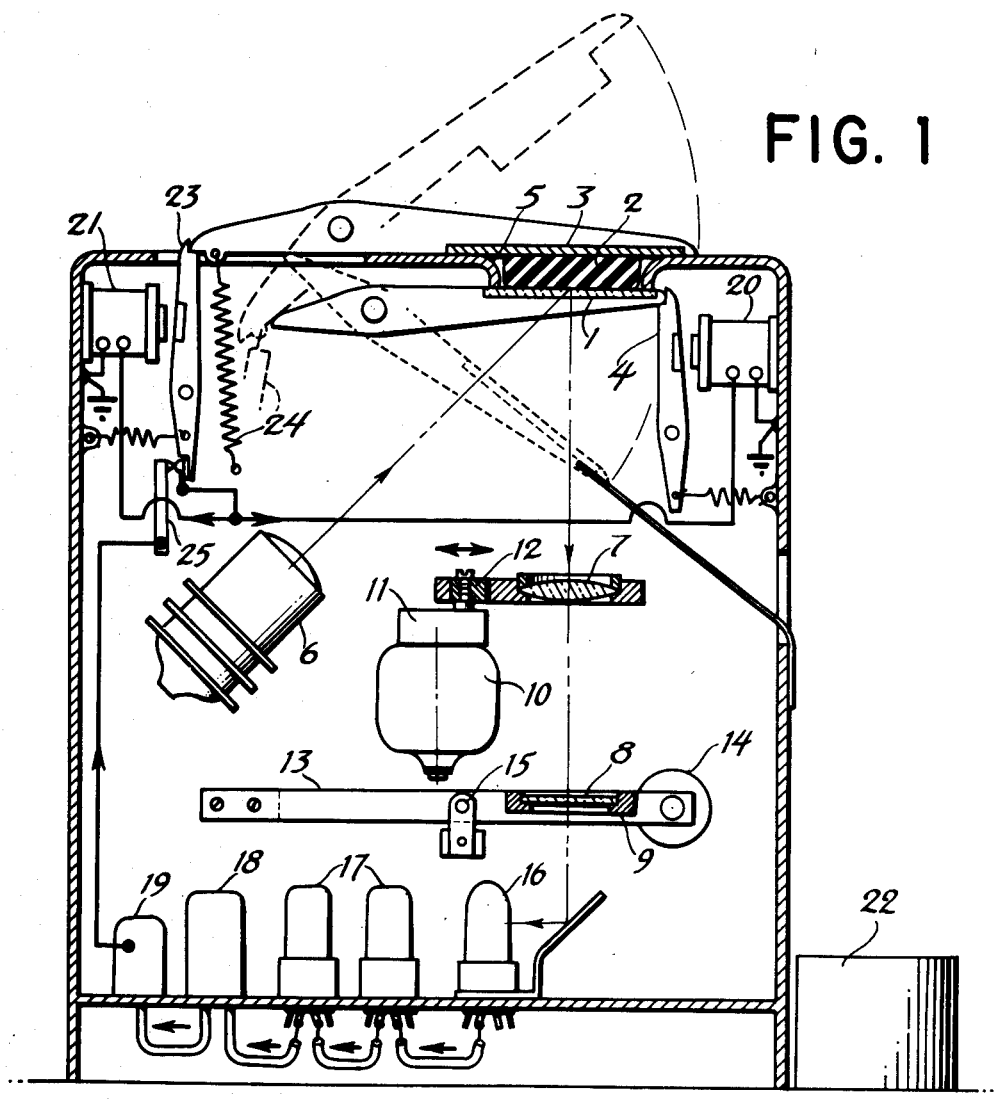
Figure 2:
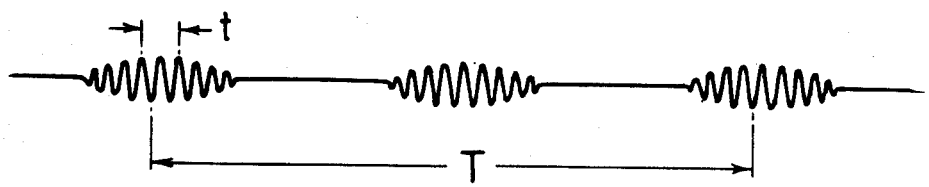

The principle upon which my apparatus is based will be understood with the help of the accompanying illustrations: Figure 1, showing a cross-section of a preferred form of the device or comparator, embodying the invention; and Figure 2, showing the time variations of light flow and of electrical potential developed within the device during its operation.

The paper document to be compared is laid down by the operator upon shelf 1, Figure 1, and held flat against said shelf by rubber pad 2, itself compressed by lid 3 which is closed by the operator after insertion of the document. Shelf 1 is made of transparent plastic, and supported by latch 4 against metal frame 5, which is made to fit the sides of the paper document and thus ensures its approximate positioning in the device. The frame 5 constitutes a box for receiving the document, the hinged shelf 1 serving as a bottom for the box.

The document is laid within frame 5 face down, and its face, upon which appears the distinctive text or illustrations of the document is illuminated by light source 6.

A real optical image of the face of the document is projected by lens 7 onto the surface of a photographic negative 8, mounted on frame 9. Said photographic negative has been obtained at some earlier time by exposing a photographic plate mounted on the same frame 9, at the same time placing a copy of the document, known to be authentic, within frame 5, and using the comparator herein described essentially as a device for photographic reproduction.

Both lens 7 and frame 9, carrying negative 8, are maintained in continuous periodic motion during operation of the device as a comparator. Lens 7 moves slowly from side to side in the plane of the drawing, driven by electric motor 10 through gearbox 11 and eccentric 12. Frame 9 oscillates rapidly back and forth in a plane perpendicular to the drawing by virtue of the mechanism consisting of spring 13, which supports frame 9, electromagnet 14 and the pair of contact points 15, which open the circuit of electromagnet 14 as soon as this has pulled spring 13 towards itself, thus causing a sustained oscillatory motion of spring 13 and frame 9, with negative 8, similar to that of an ordinary vibrator or buzzer arrangement. The periodic motion described above effects periodic scanning movement of the image with respect to the negative 8.

For a fuller understanding of the operation of the comparator from this point on, the terms "full register," "parallel register" and "perpendicular register" will be used as here defined. The real image of the document hereafter called "the image," is said to be in "full register" with negative, hereafter called "the negative," when each point of the image falls upon and coincides with the corresponding point of the negative.

When each point of the image can be brought to coincide with the corresponding point of the negative by causing either the image, or the negative, to move in a plane parallel to the drawing of Figure 1, the image is said to be in "parallel register" with the negative.

When each point of the image can be brought to coincide with the corresponding point of the negative by causing the image, or the negative, to move in a plane perpendicular to the drawing of Figure 1, the image is said to be in "perpendicular register" with the negative.

Bearing in mind the above definitions, it will be apparent that if the slow oscillation of lens 7 parallel to the plane of the drawing is ample enough, there will be a time during the cycle of said slow oscillation when the image and the negative will be in parallel register. At this time, the rapid oscillation of frame 9, provided its amplitude is sufficient, will bring about a condition of full register twice in each cycle of said rapid oscillation. The comparator is so designed that both oscillation amplitudes of lens 7 and frame 9 are large enough to fulfill the above conditions, so that in effect full register will recur instantaneously at twice the rate of the rapid oscillation but its recurrence will be limited to a limited number of cycles of said rapid oscillation, because after a short time the image will be carried beyond the position of parallel register by the slow oscillation of lens 7.

When the image and the negative are in full register, the amount of light transmitted through the negative will be at a minimum, because under these conditions each luminous area of th image falls upon an opaque area of the negative. It is therefore apparent that when the comparator operates in the manner heretofore described, and provided the document is identical to the authentic copy used in the preparation of the negative, so that a condition of full register is possible, the light flux transmitted through the negative will be subject to variations with time approximately as shown by the time plot of Figure 2, on which the distance designated by $t$ represents the period of the rapid oscillation, and $T$ that of the slow oscillation.

The light flux transmitted through negative 8 is diffused by an opaque white surface and collected in part by phototube 16, which is wired into the circuit of amplifier 17 in the conventional manner. An electrical signal similar to the light flux variations shown in Figure 2 will go through amplifier 17 and band-pass filter 18, which is designed to eliminate spurious noise by transmitting only a range of frequencies closely surrounding the frequency of the signal, which is twice the frequency of the oscillatory motion of lens 8. Finally the amplified and filtered signal is rectified and used to energize relay 19. Said relay energizes two electromagnets, 20 and 21, of which 21 is of the delayed action type. Electromagnet 20 pulls out latch 4, allowing shelf 1 to drop to the inclined position shown dotted, and the document to fall into receptacle 22. Electromagnet 21 then comes into action and attracts latch 23, allowing spring 24 to raise lid 3 into the position shown dotted. This motion of lid 3 in turn forces shelf 1 to return to its horizontal position, where it remains by virtue of the locking action of latch 4. Another function of electromagnet 21 is to open a pair of contacts 25, thus open-circuiting its own coil and that of electromagnet 20. At this time the device is ready for the next operation.

In the event of the document under test is not identical to the one used in producing negative 8, no signal, or a signal of insufficient strength, is produced; electromagnets 20 and 21 do not operate and lid 3 does not open until the operator, by use of a manually controlled switch, energizes electromagnet 21; the operator then finds the rejected document still in place on shelf 1, removes it and replaces it with the next.

Many possible variations of the device described, relying substantially upon the same principle, may be built. It is a matter of indifference whether lens 7, or the equivalent, is endowed with slow oscillatory motion, and negative 8 with rapid oscillations, or vice versa. It is also possible for the document itself to have either oscillatory movement: or both oscillations may be impressed at the same time upon either one of the three objects, lens, negative or document. The lens may be dispensed with entirely, by having the document and the negative immediately superimposed and moving one with respect to the other. Or, in some cases the slow oscillatory motion may be dispensed with altogether, the margins of the document being cut with sufficient precision to ensure parallel register. A photographic reproduction or positive may be used in place of the negative with substantially the same effect: or the authentic copy itself may be so used.

In another modification of the device, several optical images of the same document are projected through different color filters, thus isolating parts of the document surface printed in different colors. Each image is focused upon the corresponding comparison standard, obtained by exposing a suitable sensitive plate to each colored image separately, and all the images are given one or both oscillatory motions. Several separate signals result and their simultaneous presence and relative size are used to determine the authenticity of the document.

Still another obvious modification of the system consists in making it entirely automatic, feeding the documents to the device by mechanical means and removing them in a similar way.

I claim:

1. Apparatus for the identification of documents or sheets of printed matter, comprising in combination: means for projecting an optical image of the document under test; means for supporting in the plane of said image a comparison standard consisting of an authentic copy of said document or its photographic reproduction, either positive or negative; means for imparting continuous periodic scanning motion of said image with respect to said reproduction, in the plane of said image, to produce full register of said image with said reproduction periodically at a definite frequency, whereby light transmitted or reflected by said standard is caused to fluctuate at said definite frequency due to the periodic recurrence of the condition of full register of said reproduction with said image; means for converting said light fluctuations into corresponding electric current variations, and a signal circuit energized by said electric current and being selectively responsive to currents of said definite frequency to provide one signal condition for a true document and a different signal condition for a false document.

2. Apparatus for the identification of documents or sheets of printed matter, comprising in combination: means for projecting an optical image of the document under test; means for supporting in the plane of said image a comparison standard consisting of an authentic copy of said document or its photographic reproduction, either positive or negative; means for imparting continuous periodic scanning motion of said image with respect to said reproduction, in the plane of said image, to produce full register of said image with said reproduction periodically at a definite frequency, whereby the light transmitted or reflected by said standard is caused to fluctuate at said definite frequency due to the periodic recurrence of the condition of full register of said reproduction with said image; a photoelectric cell influenced by said fluctuating light, an amplifier for amplifying the current produced by said cell, a band-pass filter embodied in said amplifier and turned to transmit a narrow band of frequencies including said definite frequency, a rectifier for rectifying the currents transmitted through said filter, and a signal device operated by said rectified currents to provide one signal condition for a true document and a different signal condition for a false document.

3. Apparatus for the identification of documents or sheets of printed matter, comprising in combination: means for projecting an optical image of the document under test; means for supporting in the plane of said image a comparison standard consisting of a photographic negative of said document, means for imparting continuous periodic motion to one of said means in one direction at right angle to the axis of said image, means for imparting continuous periodic motion to one of said means in a direction at right angle to said one direction, and at a higher frequency than said first periodic movement, thereby to produce full register of said image with said negative periodically at a definite frequency, whereby the light transmitted through said negative is caused to fluctuate at said definite frequency due to the periodic recurrence of the condition of full register of said image with said negative; means for converting said light fluctuations into an alternating electric current of the same definite frequency; and a signal device actuated by said alternating current to provide one signal condition for a true document and a different signal condition for a false document.

4. Apparatus for the identification of documents or sheets of printed matter, comprising in combination: a lens for projecting an optical image of the document under test; a frame for supporting in the plane of said image a comparison standard consisting of an authentic photographic negative of said document; means for imparting continuous periodic motion to said lens in one direction at right angle to the axis of the lens, means for imparting continuous periodic motion to said frame in a direction at right angle to said one direction and at right angle to the lens axis, one periodic movement being at a higher frequency than the other periodic movement, thereby to produce full register of said image with said negative periodically at a definite frequency, whereby the light transmitted through said negative is caused to fluctuate at said definite frequency due to the periodic recurrence of the condition of full register of said image with said negative; means for converting said light fluctuations into an alternating electric current of the same definite frequency; and a signal device actuated by said alternating current to provide one signal condition for a true document and a different signal condition for a false document.

5. Apparatus for the identification of documents or sheets of printed matter, comprising in combination: a box for receiving the document to be tested, a hinged bottom wall for said box formed of transparent material, a latch normally holding said hinged bottom wall in closed position, a hinged lid for said box having biasing means normally urging said lid into open position, a latch for holding said lid in closed position, a lens located below said bottom wall for forming an optical image of the document carried by said bottom wall, a frame for supporting in the plane of said image a comparison standard consisting of an authentic photographic negative of said document, means for imparting continuous periodic scanning motion of said image with respect to said negative, in the plane of said image, to produce full register of said image with said negative periodically at a definite frequency, whereby the light transmitted through said negative is caused to fluctuate at said definite frequency due to to the periodic recurrence of the condition of full register of said image with said negative; means for converting said light fluctuations into corresponding electric current variations, a signal circuit energized by said electric current and being selectively responsive to currents of said definite frequency; and individual electromagnets arranged to release the said latches and being connected in said signal circuit whereby said magnets are energized upon the scanning of a true document.

PAUL J. SELGIN.

References Cited in the file of this patent

UNITED STATES PATENTS

| Number | Name | Date |
|---|---|---|
| 1,135,919 | Pilkington | Apr. 13, 1915 |
| 1,775,794 | White | Sept. 16, 1930 |
| 1,794,340 | Parkhurst | Feb. 24, 1931 |
| 1,958,612 | Dawson | May 15, 1934 |
| 2,211,320 | Efron | Aug. 13, 1940 |
| 2,265,037 | Gulliksen | Dec. 2, 1941 |
| 2,406,451 | Borkenstein | Aug. 27, 1946 |
| 2,427,256 | Butscher | Sept. 9, 1947 |
| 2,460,350 | Hinman | Feb. 1, 1949 |
| 2,470,877 | Stuland | May 24, 1949 |
| 2,552,156 | De France | May 8, 1951 |